(12) United States Patent
Hou et al.

(10) Patent No.: US 10,160,600 B2
(45) Date of Patent: Dec. 25, 2018

(54) CONVEYOR BELT

(71) Applicant: The Yokohama Rubber Co., LTD., Minato-ku, Tokyo (JP)

(72) Inventors: Gang Hou, Hiratsuka (JP); Ryotaro Suefuji, Hiratsuka (JP); Atsushi Miyajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/578,680

(22) PCT Filed: May 11, 2016

(86) PCT No.: PCT/JP2016/064051
§ 371 (c)(1),
(2) Date: Nov. 30, 2017

(87) PCT Pub. No.: WO2016/194569
PCT Pub. Date: Dec. 8, 2016

(65) Prior Publication Data
US 2018/0148263 A1   May 31, 2018

(30) Foreign Application Priority Data
Jun. 3, 2015 (JP) ................................. 2015-112881

(51) Int. Cl.
*B65G 15/36* (2006.01)
*B65G 15/34* (2006.01)
(Continued)

(52) U.S. Cl.
CPC ........... *B65G 15/36* (2013.01); *D03D 1/0094* (2013.01); *D03D 15/00* (2013.01); *D07B 1/06* (2013.01);
(Continued)

(58) Field of Classification Search
CPC ...... B65G 15/36; B65G 15/34; D03D 1/0094; D03D 15/00; D07B 1/068; D10B 2101/20
See application file for complete search history.

(56) References Cited

U.S. PATENT DOCUMENTS 4,651,513 A   3/1987   Dambre
5,609,242 A   3/1997   Hutchins et al.
(Continued)

FOREIGN PATENT DOCUMENTS

CA   2908763 A1 * 10/2014 ............. B65G 15/36
JP   S61-084233       4/1986
(Continued)

OTHER PUBLICATIONS

International Search Report for International Application No. PCT/JP2016/064051 dated Jun. 21, 2016, 4 pages, Japan.

*Primary Examiner* — Mark A Deuble
(74) *Attorney, Agent, or Firm* — Thorpe North & Western

(57) ABSTRACT

The present technology provides a conveyor belt. An upper cover rubber and a lower cover rubber are respectively disposed above and below a core layer so as to sandwich the core layer, which core layer is composed of a plurality of steel cords extending side by side in parallel. The outer diameter of the steel cords is not less than 0.35 mm and not greater than 6.0 mm, and the side-by-side pitch P of the steel cords is greater than 0.35 mm and not greater than 7.0 mm. The steel cords are embedded extending in the longitudinal direction of the conveyor belt.

4 Claims, 7 Drawing Sheets

(51) Int. Cl.
*D03D 1/06* (2006.01)
*D03D 15/00* (2006.01)
*D07B 1/06* (2006.01)
*D03D 1/00* (2006.01)

(52) U.S. Cl.
CPC ............ D07B 1/068 (2013.01); *D07B 1/0626* (2013.01); *D07B 1/0633* (2013.01); *D07B 2501/2076* (2013.01); *D10B 2101/20* (2013.01); *D10B 2505/00* (2013.01)

(56) References Cited

U.S. PATENT DOCUMENTS

2011/0017378 A1* 1/2011 Shimada .............. B60C 9/0042
152/527
2015/0246775 A1 9/2015 Suefuji

FOREIGN PATENT DOCUMENTS

| | | |
|---|---|---|
| JP | H04-209115 | 7/1992 |
| JP | H09-030625 | 2/1997 |
| JP | 2000-045189 | 2/2000 |
| JP | 2009-114592 | 5/2009 |
| JP | 2012-036539 | 2/2012 |
| JP | 2013-204165 | 10/2013 |
| JP | 2014-055363 | 3/2014 |
| WO | WO 2014/042097 | 3/2014 |

\* cited by examiner

CONVEYOR BELT

TECHNICAL FIELD

The present technology relates to a conveyor belt, and more particularly to a conveyor belt capable of effectively reducing the energy required to manufacture and use the conveyor belt, without sacrificing the reinforcing function imparted by a core layer.

BACKGROUND ART

A core layer for reinforcing the rubber used to constitute a conveyor belt by bearing the tension generated at the time of stretching is embedded in a conveyor belt. Steel cords constituted by steel wires intertwined together are used as reinforcing members which constitute the core layer. The structures of steel cords vary, but there is a known strand structure which, for example, has a plurality of sheath strands intertwined around the outer circumferential surface of a core strand (specifically, see Japanese Unexamined Patent Application Publication No. 2012-036539). To manufacture a conveyor belt, a core layer composed of a plurality of steel cords extending side by side in parallel is embedded in an unvulcanized rubber member to form a molded article. Thereafter, the molded article is heated at a predetermined temperature and pressurized at a predetermined pressure in a vulcanization process to vulcanize the unvulcanized rubber. Thus, a conveyor belt in which a core layer composed of steel cords is embedded in the rubber is completed.

In recent years, there has been an increasing awareness of energy conservation, and the demand for energy conservation in conveyor belts has intensified as a result. For example, when a conveyor belt is reduced in weight, the energy required to transport and use the conveyor belt can be reduced. Alternatively, when a conveyor belt is reduced in thickness, this contributes to a reduction in weight and also enables a reduction in vulcanization time, which makes it possible to reduce the energy required for manufacture.

Therefore, reducing the weight and thickness of a core layer makes it possible to achieve energy conservation. However, when a core layer is simply reduced in weight and thickness, there is a problem in that the original reinforcing function of the core layer is diminished.

SUMMARY

The present technology provides a conveyor belt capable of effectively reducing the energy required to manufacture and use a conveyor belt, without sacrificing the reinforcing function imparted by the core layer.

The conveyor belt of the present technology comprises a core layer composed of a plurality of steel cords extending side by side in parallel, and an upper cover rubber and a lower cover rubber respectively disposed above and below the core layer so as to sandwich the core layer, the steel cords being embedded extending in the longitudinal direction; an outer diameter of the steel cords being not less than 0.35 mm and not greater than 6.0 mm, and a side-by-side pitch of the steel cords being greater than 0.35 mm and not greater than 7.0 mm.

With the conveyor belt of the present technology, it is possible to reduce the thickness and weight of the conveyor belt by setting the diameter of the steel cords constituting the core layer to not less than 0.35 mm and not greater than 6.0 mm, which is a smaller diameter than that of conventional steel cords. As a result, it is possible to reduce the energy required to transport and operate the conveyor belt. In addition, a reduction in the thickness of the conveyor belt also leads to a reduction in the vulcanization time of the conveyor belt, which makes it possible to also reduce the energy required to manufacture the conveyor belt. It is therefore possible to effectively reduce the energy required to manufacture and use the conveyor belt.

Reducing the diameter of steel cords while reducing the side-by-side pitch of the steel cords in comparison to that of conventional steel cords enhances the steel cord number density per unit belt width. This makes it possible to ensure that there is no loss in the reinforcing function of the core layer.

DETAILED DESCRIPTION

Figure 1:
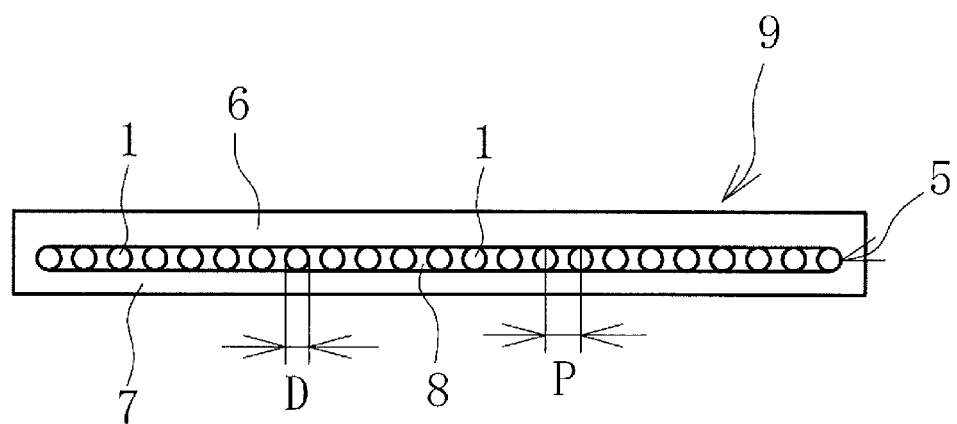
FIG. 1 is a horizontal cross-sectional view illustrating the conveyor belt of the present technology.

Below, description will be given of the conveyor belt of the present technology based on embodiments illustrated in the drawings.

Figure 2:
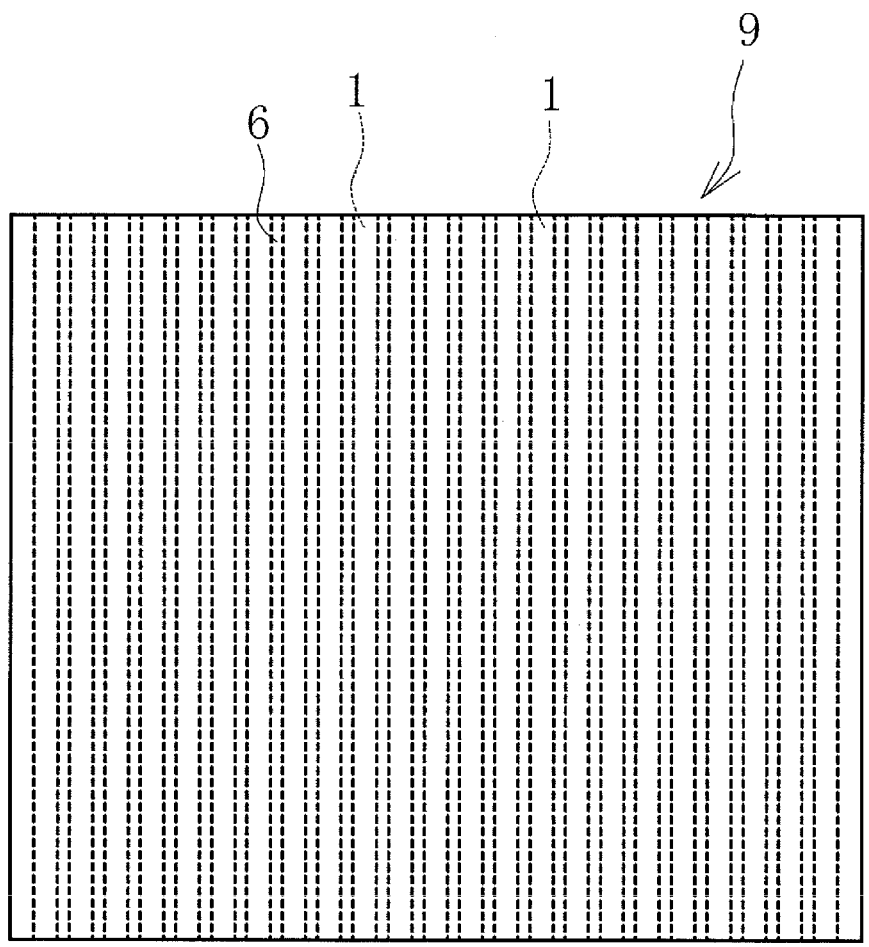
FIG. 2 is a plan view of the conveyor belt illustrated in FIG. 1.

A conveyor belt 9 of the present technology illustrated in FIGS. 1 and 2 includes a core layer 5 as well as an upper cover rubber 6 and a lower cover rubber 7 disposed so as to sandwich the core layer 5 vertically, and these are formed integrally. The core layer 5 is composed of a plurality of steel cords 1. The plurality of steel cords 1 are arranged side by side in parallel in the belt width direction and are embedded in the rubber that forms the conveyor belt 9 so as to extend in the belt longitudinal direction.

Specifically, each steel cord 1 is covered by a cushion rubber 8, and the steel cords 1 and the cushion rubber 8 are joined by vulcanization bonding. The cushion rubber 8 is a rubber having excellent adhesiveness. The cushion rubber 8 is formed integrally with the upper cover rubber 6 and the lower cover rubber 7 by vulcanization bonding. Other constituents such as edge rubbers disposed at both ends in the belt width direction are also added as necessary to the conveyor belt 9.

The upper cover rubber 6 and the lower cover rubber 7 are made of a diene rubber containing at least a natural rubber, and a rubber composition having wear resistance enhanced by carbon black or the like is used. The thicknesses of the upper cover rubber 6 and the lower cover rubber 7 are determined appropriately in accordance with the performance required for the conveyor belt 9.

The steel cords 1 are formed by intertwining a plurality of steel wires. The steel cords 1 are substantially straight without any kinks. That is, the steel cords 1 are not crimped. The structure of the steel cords 1 is described below. It is preferable to alternately arrange one S-twist steel cord 1 and one Z-twist steel cord 1 side by side in parallel.

The outer diameter D of the steel cords 1 is set to not less than 0.35 mm and not greater than 6.0 mm. The strength of the steel cords 1 is, for example, not less than 500 kN and not greater than 5000 kN.

The side-by-side pitch P of the steel cords 1 is set to greater than 0.35 mm and not greater than 7.0 mm. A cushion rubber 8 is interposed in the gaps between adjacent steel cords 1 arranged side by side in parallel so that the steel cords 1 do not touch one another. Therefore, the gaps between adjacent steel cords 1 arranged side by side in parallel are greater than 0 mm. The gaps are preferably not greater than the outer diameter D of the steel cords 1 and are, for example, not less than 0.2 mm and not greater than 1.5 mm.

Figure 3:
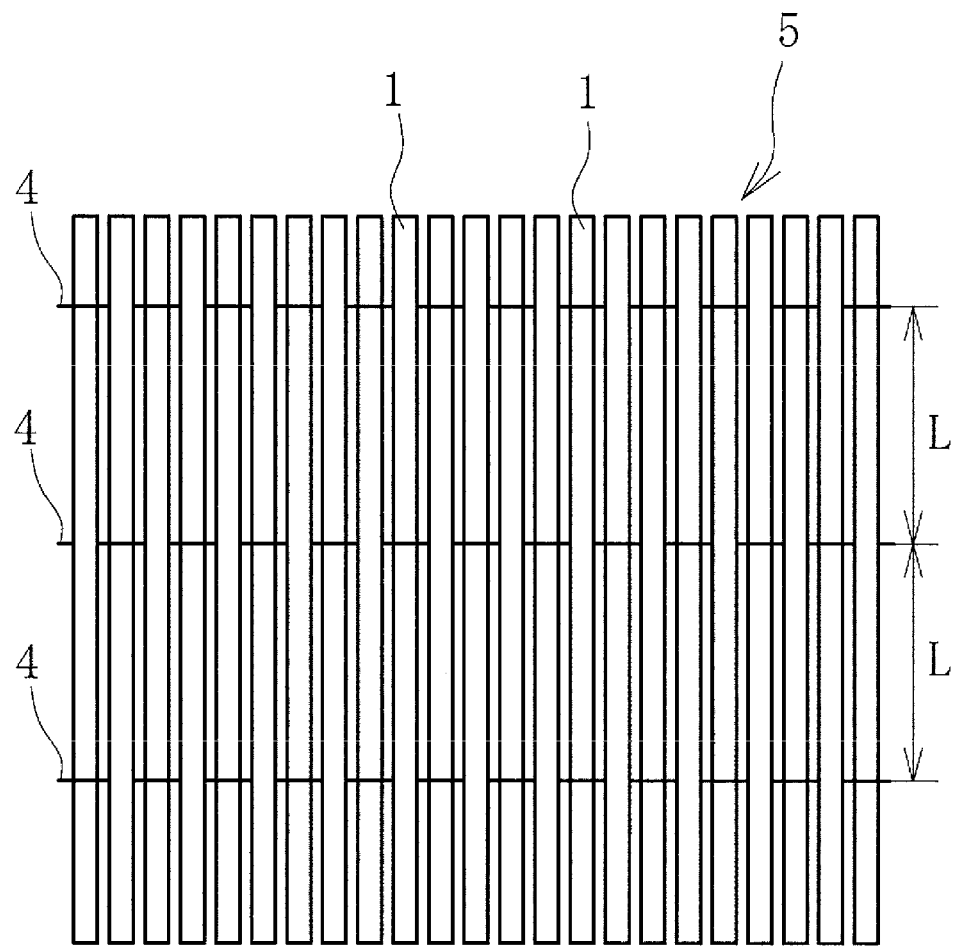
FIG. 3 is an explanatory diagram illustrating a core layer of FIG. 1 in a plan view.
Figure 4:
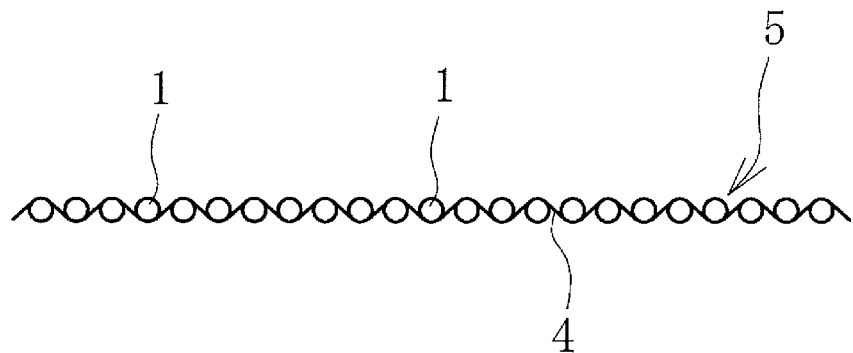
FIG. 4 is an explanatory diagram illustrating the core layer of FIG. 3 in a horizontal cross-sectional view.

As illustrated in FIGS. 3 and 4, in the core layer 5 of this embodiment, weft threads 4 pass vertically in a stitched manner between the steel cords 1 arranged side by side in parallel so as to traverse the steel cords 1. The weft threads 4 are disposed with a spacing L in the longitudinal direction of the steel cords 1.

The weft threads 4 are subjected to RFL (resorcinol formaldehyde latex) dip treatment in the manufacturing process. In RFL dip treatment, after the weft threads 4 are immersed in an RFL treatment liquid, the weft threads are dried so as to form an RFL treatment liquid coating on the surfaces of the weft threads 4. The weft threads 4 allow the steel cords 1 to be connected with one another.

The weft threads 4 can be provided optionally. Providing the weft threads 4 inhibits the disarrangement of the plurality of steel cords 1 arranged side by side in parallel in the manufacturing process. As such, the handleability of the core layer 5 is markedly enhanced, which contributes to the improvement of the productivity of the conveyor belt 9.

The spacing L between the weft threads 4 is set, for example, to not less than 16 mm and not greater than 500 mm. When this spacing L is less than 16 mm, the number of man-hours required to manufacture the core layer 5 becomes excessively large. On the other hand, when the spacing L exceeds 500 mm, the effect of preventing the disarrangement of the steel cords 1 imparted by the weft threads 4 becomes too small.

In FIG. 3, the positions at which the adjacent weft threads 4 stitch the steel cords 1 together vertically are offset by the spacing L. That is, for a steel cord 1 having one adjacent weft thread 4 disposed on the upper side with the spacing L, the other adjacent weft thread 4 is disposed on the lower side of the steel cord 1.

Figure 5:
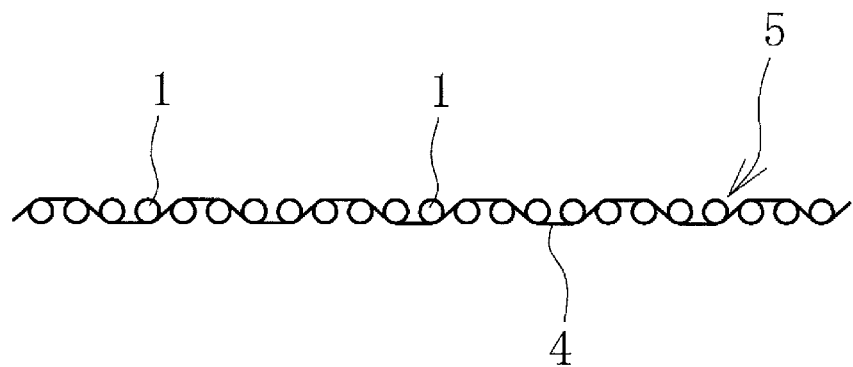
FIG. 5 is an explanatory diagram illustrating a modified example of the core layer in a horizontal cross-sectional view.

The weft threads 4 may not only traverse each steel cord 1 vertically in a stitching manner as illustrated in FIGS. 3 and 4, but they may also traverse each set of two steel cords 1 vertically in a stitching manner as illustrated in FIG. 5. Alternatively, the weft threads 4 may also traverse each set of 3 or 4 steel cords 1 vertically in a stitching manner.

Resin fibers, for example, are used as the weft threads 4. Specifically, polyester fibers, nylon (nylon 6 or nylon 66) fibers, rayon fibers, aramid fibers, vinylon fibers, polyurethane fibers, or the like are used as the weft threads 4.

Taking into consideration flexibility or durability, the weft threads 4 are formed by weaving a plurality of long fibers, for example, and the fineness is set to not less than 300 dtex and not greater than 5000 dtex. The weft threads 4 have smaller diameters than that of the steel cords 1.

The steel cords 1 may employ various structures. One cord configuration from among a cord with a 1+6 configuration illustrated in FIG. 6, a cord with a 3+6 configuration illustrated in FIG. 7, a cord with a 1+19 configuration illustrated in FIG. 8, and a cord with a 1+Sew (19) configuration illustrated in FIG. 19 is used.

The twist multiple of the steel cords 1 is preferably set to not less than 9 and not greater than 14. The twist multiple is a value T/D indicating the ratio of the twisting pitch T of the steel cords 1 to the outer diameter D of the steel cords 1. When the twist multiple is less than 9, the strength of the steel cords 1 becomes insufficient, whereas when the twist multiple is greater than 14, it is not possible to ensure sufficient fatigue resistance.

Figure 6:
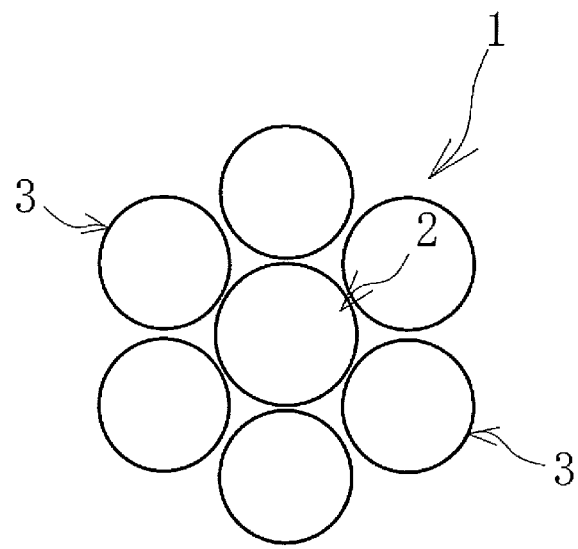
FIG. 6 is an explanatory diagram illustrating steel cords of FIG. 1 in a horizontal cross-sectional view.

The steel cords 1 of the 1+6 configuration illustrated in FIG. 6 have an open structure in which six steel wires serving as side strands 3 are intertwined around the outer circumferential surface of one steel wire serving as a core strand 2.

Figure 7:
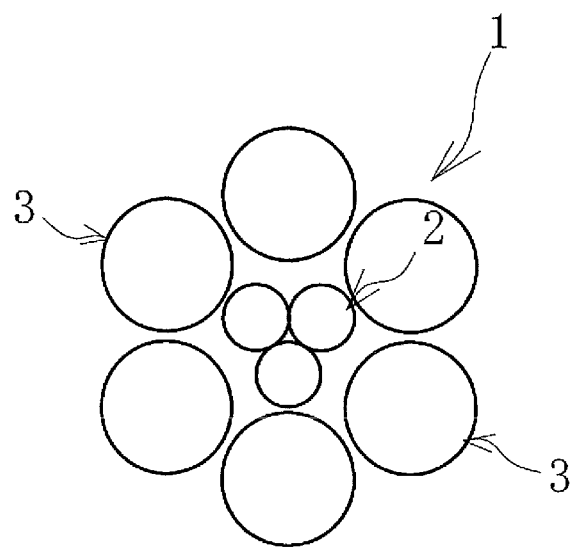
FIG. 7 is an explanatory diagram illustrating a modified example of the steel cords in a horizontal cross-sectional view.

A steel cord 1 of the 3+6 configuration illustrated in FIG. 7 has an open structure in which six steel wires serving as side strands 3 are intertwined around the outer circumferential surface of three steel wires serving as core strands 2.

Figure 8:
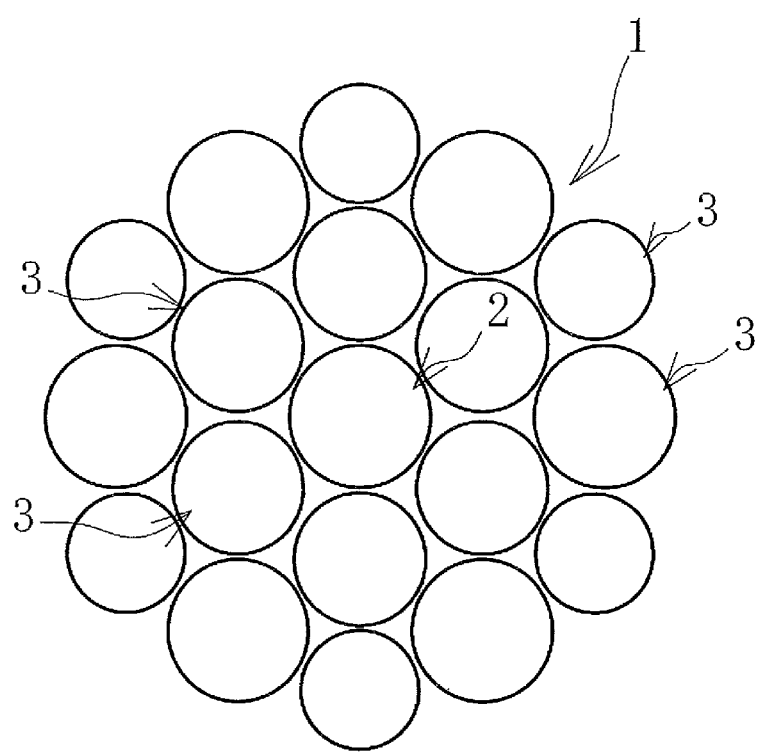
FIG. 8 is an explanatory diagram illustrating another modified example of the steel cords in a horizontal cross-sectional view.

A steel cord 1 of the 1+19 configuration illustrated in FIG. 8 has an open structure in which six steel wires serving as side strands 3 are intertwined around the outer circumferential surface of one steel wire serving as a core strand 2, and 12 steel wires serving as side strands 3 are further intertwined around the outer circumferential surface thereof.

Figure 9:
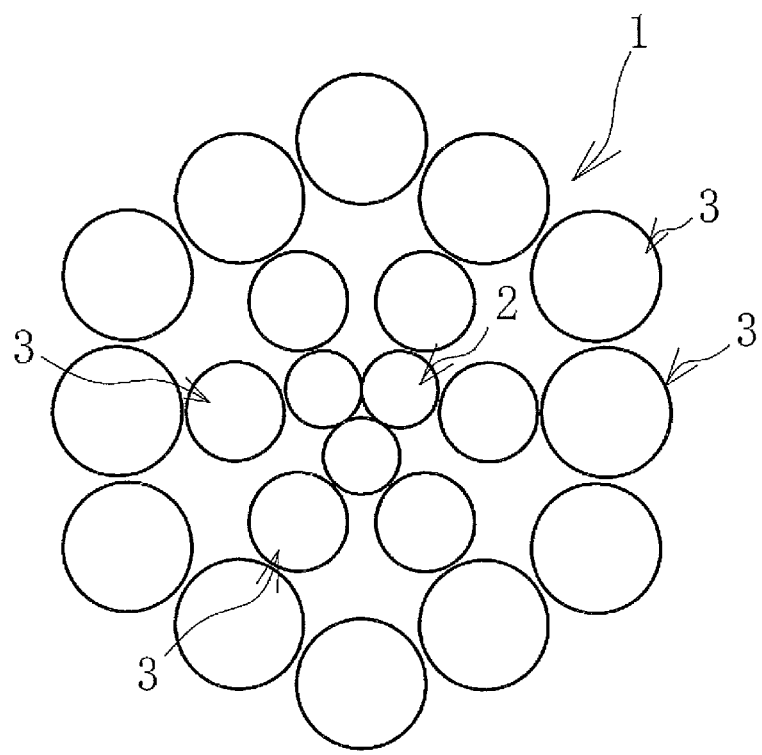
FIG. 9 is an explanatory diagram illustrating another modified example of the steel cords in a horizontal cross-sectional view.

A steel cord 1 of the 1+Sew (19) configuration illustrated in FIG. 9 has an open structure in which six steel wires serving as side strands 3 are intertwined around the outer circumferential surface of three steel wires serving as core strands 2, and 12 steel wires serving as side strands 3 are further intertwined around the outer circumferential surface thereof.

When two types of steel wires with different outer diameters are used for the side strands 3 of the steel cord 1, the outer diameter of the steel wire with the relatively smaller diameter should be set to not less than 60% and not greater than 90% of the outer diameter of the steel wire with the relatively larger diameter. This enhances the permeability of the rubber.

In the case of the conveyor belt 9 of the present technology, the diameter of the steel cords 1 constituting the core layer 5 is set to not less than 0.35 mm and not greater than 6.0 mm, which is a smaller diameter than that of conventional steel cords, so the thickness and weight of the conveyor belt 9 are reduced. This makes it possible to reduce the energy required to transport the conveyor belt 9 to the site of use or to operate the conveyor belt 9 at the site of use.

In the manufacturing process of this conveyor belt 9, the reduction in thickness of the conveyor belt 9 resulting from the reduction in thickness of the core layer 5 leads to a reduction in the vulcanization time of the conveyor belt 9. Therefore, it is also possible to reduce the energy required to manufacture the conveyor belt 9. Therefore, in the present technology, it is possible to effectively reduce the energy required to manufacture and use the conveyor belt 9.

Making the diameter of the steel cords 1 small reduces the strength of each steel cord 1. However, the side-by-side pitch P of the steel cords 1 is set to greater than 0.35 mm and not greater than 7.0 mm, which is much shorter than that of conventional steel cords. Therefore, the steel cord 1 number density per unit belt width is enhanced. Accordingly, the number of steel cords 1 that can be embedded per unit belt width increases, which makes it possible to achieve sufficient total strength as a core layer 5 and to ensure that there is no loss in the reinforcing function thereof.

As a result of the reduction in thickness in the conveyor belt 9, the flexural rigidity of the conveyor belt 9 becomes small, and the energy loss occurring when traveling around the pulleys decreases. In addition, embedding a single core layer 5 composed of the steel cords 1 in a conveyor belt 9 is conventional common sense. The reason for this is that when a plurality of core layers 5 are embedded, a compressive force acts on the steel cords 1 constituting the core layer 5 embedded on the inner peripheral side when the conveyor belt 9 travels around the pulleys, which tends to lead to buckling. However, even if a plurality of these core layers 5 having a reduced thickness are embedded in the conveyor belt 9, the distance from the neutral plane of the steel cords 1 constituting the core layers 5 embedded on the inner peripheral side becomes small when the conveyor belt 9 travels around the pulleys. Therefore, the compression force acting on the steel cords 1 becomes very small, which makes it possible to embed a plurality of core layers 5 in the conveyor belt 9.

When the outer diameter D of the steel cords 1 is set to not less than 0.35 mm and not greater than 6.0 mm, it is possible to dramatically reduce the energy required to manufacture and use the conveyor belt 9 while ensuring the reinforcing function of the core layer 5.

Here, the weight and vulcanization time of conveyor belts are estimated for cases where conveyor belts in which a single core layer is embedded are manufactured so as to have the same performance (the total strength of the core layer is substantially the same) and a thickness of 36.5 mm by varying only the outer diameters and number of the steel cords constituting the core layer 5. A specification in which the outer diameter D of the steel cords is set to 10.4 mm, the side-by-side pitch P is set to 16 mm, and the number of embedded cords is set to 59 is used as a conventional example. A specification in which the outer diameter D of the steel cords is set to 6.0 mm, the side-by-side pitch P is set to 7.0 mm, and the number of embedded cords is set to 135 is used as an example.

When the conventional example and the example are compared, the weight of the conveyor belt of the example can be reduced by approximately 18% in comparison to the conventional example, and the vulcanization time can be reduced by approximately 15%.

The invention claimed is:

1. A conveyor belt comprising a core layer composed of a plurality of steel cords extending side by side in parallel, and an upper cover rubber and a lower cover rubber respectively disposed above and below the core layer so as to sandwich the core layer, the steel cords being embedded in the core layer extending in a longitudinal direction;

an outer diameter of the steel cords being not less than 0.35 mm and not greater than 6.0 mm, and a side-by-side pitch of the steel cords being greater than 0.35 mm and not greater than 7.0 mm, and wherein weft threads of resin fibers are provided passing vertically in a stitched manner between the steel cords arranged side by side in parallel so as to traverse the steel cords, and the weft threads are disposed with a spacing set to not less than 16 mm and not greater than 500 mm in a longitudinal direction of the steel cords.

2. The conveyor belt according to claim 1, wherein a structure of the steel cords is any one cord configuration from among cords with a 1+6 configuration, cords with a 3+6 configuration, cords with a 1+19 configuration, and cords with a 1+Sew (19) configuration, and a twist multiple of the steel cords is not less than 9 and not greater than 14.

3. The conveyor belt according to claim 1, wherein the weft threads are constituted by weaving a plurality of long fibers, and a fineness is not less than 300 decitex and not greater than 5000 decitex.

4. The conveyor belt according to claim 2, wherein the weft threads are constituted by weaving a plurality of long fibers, and a fineness is not less than 300 decitex and not greater than 5000 decitex.

* * * * *